United States Patent [19]

Grace

[11] 3,810,033

[45] May 7, 1974

[54] BROAD BAND HIGH EFFICIENCY AMPLIFIER WITH IMPROVED BAND WIDTH

[75] Inventor: Martin I. Grace, Framingham, Mass.

[73] Assignee: Sperry Rand Corporation, New York, N.Y.

[22] Filed: May 17, 1972

[21] Appl. No.: 254,147

[52] U.S. Cl. .................. 330/53, 330/56

[51] Int. Cl. .................. H03f 3/60

[58] Field of Search .................. 330/56, 53, 34 C, 73 C

[56] References Cited

UNITED STATES PATENTS 3,673,510 6/1972 Grace et al. .................. 330/56 X

*Primary Examiner*—Nathan Kaufman

*Attorney, Agent, or Firm*—Howard P. Terry

[57] ABSTRACT

An active high-efficiency-mode semiconductor diode is coupled to oscillating high frequency fields in a transmission line network for amplifying those electromagnetic fields, the apparatus taking the form of a single port high frequency device. The selected diode and the transmission line network provide means for elimination of time delayed triggering of undesired oscillations within the amplifier. Further, operating band width is increased by selection of a diode package that is anti-resonant at the second harmonic of the fundamental frequency signal being amplified, the diode itself reflecting small-signal negative resistance characteristics at that harmonic.

3 Claims, 10 Drawing Figures

BROAD BAND HIGH EFFICIENCY AMPLIFIER WITH IMPROVED BAND WIDTH

The invention herein described was made in the course of or under a contract or a subcontract thereunder with the United States Air Force.

CROSS-REFERENCES

This invention is an improvement over an invention disclosed and claimed in the M.I. Grace U.S. Pat. No. 3,646,581, entitled: "Semiconductor Diode High Frequency Signal Generator," issued Feb. 20, 1972, and assigned to the Sperry Rand Corporation. The invention is also an improvement over the devices described in M.I. Grace and H.J. Pratt in the United States Patent Application Ser. No. 78,720 for a "Broad Band High Efficiency Amplifier," filed Oct. 7, 1970, now U.S. Pat. No. 3,673,510 and by M.I. Grace, H. Kroger, and H.J. Pratt in the United States Patent Application Ser. No. 102,738 for a "Broad Band High Efficiency Mode Energy Converter," filed Dec. 30, 1970 now U.S. Pat. No. 3,714,605. Both applications are assigned to the Sperry Rand Corporation.

BACKGROUND OF THE INVENTION

1. Field of the Invention

The invention pertains to high frequency transmission line semiconductor diode amplifiers and more particularly relates to means in such semiconductor energy converter devices for preventing the generation of undesired oscillations while operating over increased band widths of amplification.

2. Description of the Prior Art

High frequency amplification has often been observed in systems combining cavity or other resonators or high frequency transmission lines with active semiconductor diodes placed in suitable electrical bias fields. Furthermore, amplifier circuits generally suitable for improved operation employing high-efficiency-mode semiconductor diodes have been devised, both in coaxial line and in other hollow wave guide forms.

It is the function of such circuits to interact effectively with high-efficiency-mode diodes and to provide both fundamental and harmonic energy at the location of the diode in particular relations required by the diode for efficient energy conversion. In other words, the associated circuit must be capable of placing the diode in an oscillating electromagnetic field simultaneously having electric field components at a fundamental frequency $f_F$ and at certain harmonics thereof.

Such coaxial line and hollow wave guide circuits become difficult to make and to adjust at high carrier frequencies, especially when they are of small size. The problems associated with devising suitable means of independently matching, tuning, and otherwise adjusting the individual parts of the circuit in which fundamental and harmonic signals mutually or separately flow are also difficult of solution. A particular problem associated in the past with known circuits of the subject type is concerned with their highly dispersive characteristics, such circuits often having high reactive variation with frequency. Where a device is to be operated as an amplifier as in the present invention, rapid change in circuit reactance as a function of frequency severely limits the possible band width of operation of the amplifier. Accordingly, repeatably attainable band widths with operation free of distorting effects have often been narrow and are extended only be extreme care in tuning and other circuit adjustments.

A second serious problem associated with prior art high-efficiency-mode semiconductor diode amplifiers is concerned with time delayed triggering of the avalanche shock front within the diode. While the benefit to the operation of high-efficiency-mode self-pulsed oscillators, such a phenomenon produces disastrously disturbing effects in a device designed for use as an amplifier.

SUMMARY OF THE INVENTION

The invention is a microwave or high frequency signal amplifier employing a high-efficiency-mode semiconductor diode as an active amplifying device in a transmission line network. A filter network located substantially at the diode has a stop band containing certain harmonics of the frequency $f_F$ of the signal to be amplified, while being transparent to the latter signal. The network is tuned to resonate the signal frequency $f_F$ to be amplified. With the special location of the filter network, time delayed triggering of the diode is not induced.

In operation, a unidirectional potential is applied across the high-efficiency-mode semiconductor diode such that it is biased near its break down lever. The high frequency signal, when superimposed upon the bias potential, produces large changes in the instantaneous diode voltage and current, which changes are such that a large negative resistance is generated at the same frequency as the fundamental frequency $f_F$ of the applied high frequency signal. The consequent current wave contains many harmonic components which are also coupled to the oscillating harmonic high frequency field to produce amplified harmonic signals, thereby improving the conversion efficiency of the diode. The efficiency and operating band widths of the amplifier are further improved by selection of a diode package that is anti-resonant at the second harmonic of the fundamental frequency signal to be amplified. Further, the selected diode package exhibits a small-signal negative resistance character-istic at the same harmonic.

DESCRIPTION OF THE PREFERRED EMBODIMENTS

Figure 1:
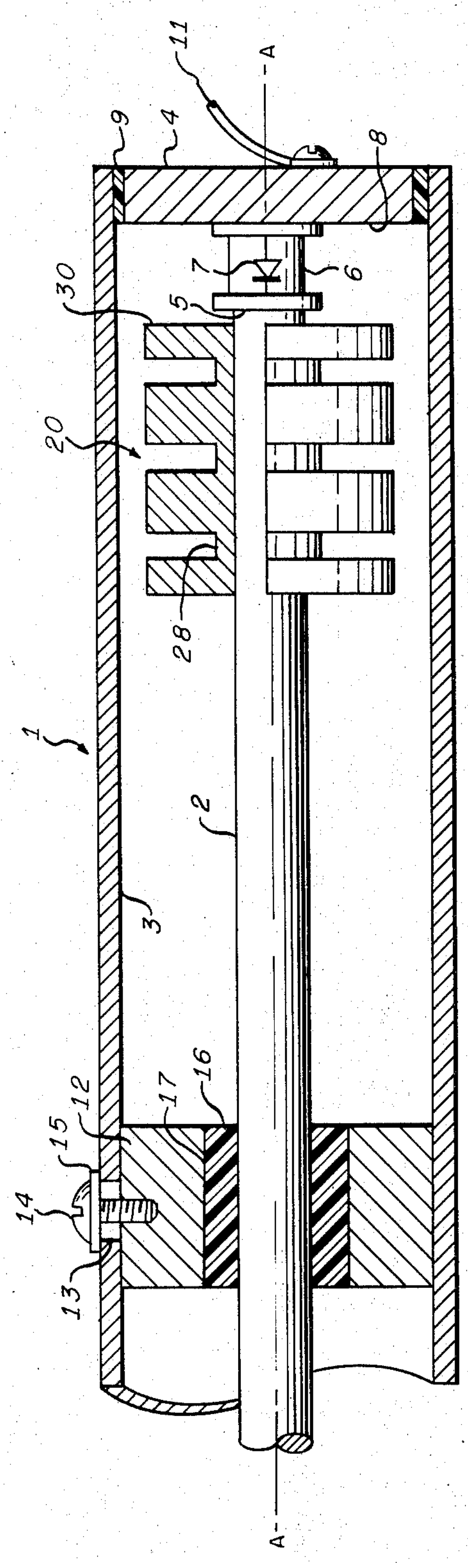
FIG. 1 is a view partly in cross section of a preferred embodiment of the invention.

FIG. 1 illustrates a preferred embodiment of the invention in a form employing a network system circularly symmetric about dot-dash line A—A and using a high frequency or microwave coaxial transmission line 1. Coaxial transmission line 1 consists of an inner conductor 2, which may be in the form of a round rod, and an outer hollow tubular conductor 3. The propagating high frequency energy is confined within the space between conductors 2 and 3, the structure being closed on one end by end wall 4. As is the usual case in high frequency circuit structures, the respective current-carrying surfaces of conductors 2 and 3 and of end wall 4 have good electrical conductivity for high frequency electrical currents.

Referring especially to FIG. 1, there is placed in series with inner conductor 2 at its end 5 a high-efficiency-mode diode package 6 whose particular detailed characteristics remain to be described. Diode package 6 is electrically poled as indicated by the symbolic representation 7 shown as if actually drawn on the surface of the diode package. At one of its ends, diode package 6 is supported in a conventional manner from the conductive surface 8 of end wall 4, as by being conductively cemented in place thereon or otherwise held in place by conventional means. Opposite the surface 8, diode package 6 may be conductively affixed in a similar manner to end 5 of inner conductor 2.

End wall 4, in addition to closing coaxial transmission line 1 and supporting diode package 6, may be used to provide the required unidirectional bias operating voltage to diode package 6, being insulated from outer conductor 3 and supported therein by a thin strip of suitable dielectric material 9. Thus, wall 4 and dielectric strip 9 form a shorting means for high frequency electric currents, so that energy cannot flow out of line 1 past wall 4. In addition, the arrangement provides means for application of the bias voltage across diode package 6, as by a bias source or battery connected at lead 11 attached to wall 4 as will further be explained in connection with FIG. 9.

Figure 2:
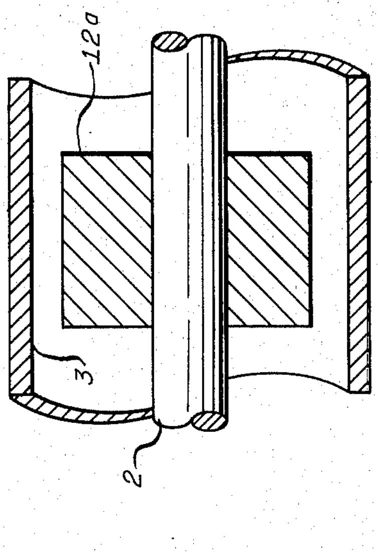
FIG. 2 is a similar view of an alternative form of a part used in FIG. 1.

At a certain location with respect to diode package 6, there is provided an adjustable tuning or impedance transforming element or network 12 whose length is one quarter wave length at the mid-operating value of fundamental frequency $f_F$. Alternatively, two such impedance transforming elements may be employed, each one eighth wave long at the mid-operating value of the fundamental frequency $f_F$. Transformer 12 comprises a circular ring-shaped element whose outer diameter permits it to be inserted in contact with the inner wall of conductor 3. Where line 1 has a 50 ohm impedance, transformer 12 may, for instance, have a 19 ohm impedance. Like conductor 3, its surfaces exposed to high frequency energy are made of a good, high-frequency-current conducting material. Tuner element 12 may be provided with means permitting it to be translated longitudinally for adjustment purposes within transmission line 1. A short longitudinal slot 13 cut through wall 3 permits tuner element 12 to be adjusted in position and then to be fastened by tightening screw 14 against washer 15, screw 14 being threaded into a mating threaded hole in element 12. Additional matching elements or networks generally of the above described kind may be used in the well known manner to extend the operating band width of the amplifier. Furthermore, a single, quarter wave transformer device 12a mounted on the inner conductor 2 of transmission line 1 may be employed where a fixed position device is satisfactory, as shown in FIG. 2.

As in FIG. 1, a dielectric tube 16 may be fastened within tuner 12 at surface 17 by cementing or by other known means. Left free to slide on the surface of inner conductor 2, tube 16 forms a convenient support for conductor 2 within conductor 1. In place of the metallic electrically conducting slug tuner 12, dielectric tuner devices may be substituted and may similarly be used to fix the relative positions of conductors 2 and 3. If such a dielectric means of support is not employed, a conventional dielectric bead (not shown) may be placed to the left of tuner 12 adjacent the input-output connection of the amplifier.

It will be understood by those skilled in the art that a leftward extension of coaxial line 1 may be coupled directly to a conventional high frequency signal circulator. One port of the circulator may be used in the conventional manner to inject signals to be amplified into the apparatus, while a second port of the circulator is used to couple out the amplified signals, as will be further explained in connection with FIG. 9.

A diode of the type known generally as the avalanche transit time diode is found to have characteristics suitable for use in the invention in diode package 6. It may be used in the form known as the trapped plasma avalanche triggered transit diode known as the TRAPATT diode. For example, the diode may be an epitaxial silicon or other p-n or step or abrupt junction diode or a p-n-n+ punch-through diode designed such that, with an electric field of suitable amplitude present, the field punches through a substrate at reverse break down. Such diodes have, for example, been described as successfully formed by diffusing boron from a boron-nitride source into a phosphorous-doped epitaxial material on a heavily doped antimony substrate. The thickness of the epitaxial layer is varied by etching, prior to diffusion, so as to produce either the abrupt p-n structure or the P-n-n+ structure.

A low pass or band pass filter 20 is placed on center conductor 2 at diode package 6. It is understood that the distributed filter 20 may be a three or multiple section low-pass filter of the well known Tchebycheff type, though other filters having related properties may be employed. It is further understood that filter 20 may alternatively pend from the inner conducting surface of outer coaxial conductor 3. Either kind of filter suspension may be constructed so that the filter is translatable longitudinally for adjustment purposes, for example, in the manner in which impedance transformer 12 is adjustable.

Filter 20 is comprised of alternate disc-shaped elements of a first characteristic impedance, with interposed elements of a second characteristic impedance level. In the form shown in FIGS. 1 and 3, the large diameter discs 21, 23, 25, and 27 are selected to have an impedance of 19 ohms, for example. The intervening small diameter discs 22, 24, and 26 have an impedance close to 50 ohms, depending upon how thin the wall 28 can conveniently be made; i.e., substantially the impedance of inner conductor 2. If filter 20 is fixed permanently to conductor 2, the discs 21, 23, 25, and 27 may be fastened directly to conductor 2 and the respective walls 28 may be omitted.

Figure 3:
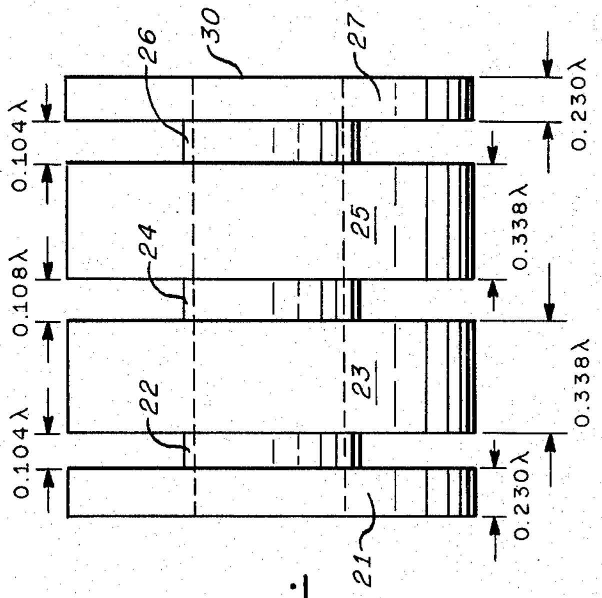
FIG. 3 is an enlarged view of a portion of FIG. 1.

As seen more clearly in FIG. 3, disc 21 has a 19 ohm impedance and is, in one successful form of the invention, made $0.230\lambda_F$ in length, where $\lambda_F$ is the wave length corresponding to the mid-operating fundamental frequency $f_F$. In the same terms, disc 22 may have a 50 ohm impedance and is $0.104\lambda_F$ long. Disc 23 is 19 ohms and may be $0.338\lambda_F$ long and disc 24 is 50 ohms and may be $0.108\lambda_F$ in axial length. The filter is symmetric about disc 24. Thus, disc 25 is 19 ohms and may be $0.338\lambda_F$ in length, disc 26 is 50 ohms and may be $0.104\lambda_F$ in length, and disc 27 is 19 ohms and may be $0.230\lambda_F$ in length.

TRAPATT diode amplifiers with improved band width are known in the art particularly as taught by the present inventor and his co-workers in the above mentioned U.S. patent applications Ser. Nos. 78,720 and 102,738. In these devices, the effects of time delayed triggering which previously afforded operation of the devices only as self-pulsed oscillators has been eliminated. In these devices, the high frequency circuit is such that high efficiency-mode continuous wave operation is enhanced, the fundamental frequency $f_F$ being efficiently coupled into the device for amplification and out of it as amplified energy. Furthermore, harmonic energy at frequencies $2f_F$ and $3f_F$ is efficiently confined generally to the region of the active diode. Additionally, previously recognized needs for broad band amplification are that the reactance slope dX/df at all fundamental and harmonic frequencies be minimized, and that time delayed triggering be suppressed.

These requirements must be fulfilled in order to excite avalanche shock front waves by external excitation of the device. In the quiescent state of such amplifiers, with substantially no signal at the fundamental frequency $f_F$ present, substantially no unidirectional current flows through the diode, so that no power is wasted. When high frequency energy of fundamental frequency $f_F$ is present within the transmission line, the electrical fields across the junction of the diode are summations of the unidirectional bias electrical field and the alternating field and its harmonic components. Whenever the time rate of increase and peak fields across the junction of the diode exceed a critical value, an avalanche shock wave is generated, causing the electric field within the diode to fall instantaneously to a very low value.

Consequently, a large current impulse is allowed to flow from the bias source battery through the diode. This current surge is abrupt and is therefore rich in harmonic energy, so that harmonic high frequency fields are readily generated in the vicinity of the diode. Amplification of any high frequency signal present in the associated transmission line obtains, causing even a small excursion of the fundamental frequency $f_F$ signal relative to the break down voltage of the diode to produce a relatively large swing of current flow through the diode. There being a wide swing in the diode current from its quiescent value of substantially zero, amplification of the fundamental $f_F$ and production of harmonic signals is an efficient process.

In the present invention, it has been discovered that a further increase in the band width and efficiency of amplification may be realized by making constructive use of the inherent non-linearities of avalanche carrier generation in diode package 6. By this means, the triggering mechanism of the avalanche shock front is additionally aided.

The novel result is achieved by arranging the diode package 6 and its associated transmission line 1 so as to satisfy particular requirements:

a. the diode package is selected or designed to have a small-signal negative resistance at the second harmonic frequency $2f_F$, b. the circuit including transmission line 1 and diode package 6 is arranged, at the second harmonic frequency $2f_F$, to represent a capacitive reactance at the diode terminals with a magnitude larger than the diode reactance at frequency $2f_F$. Accordingly, the associated circuit is to appear at the diode package terminals to be anti-resonant.

Figures 4, 5:
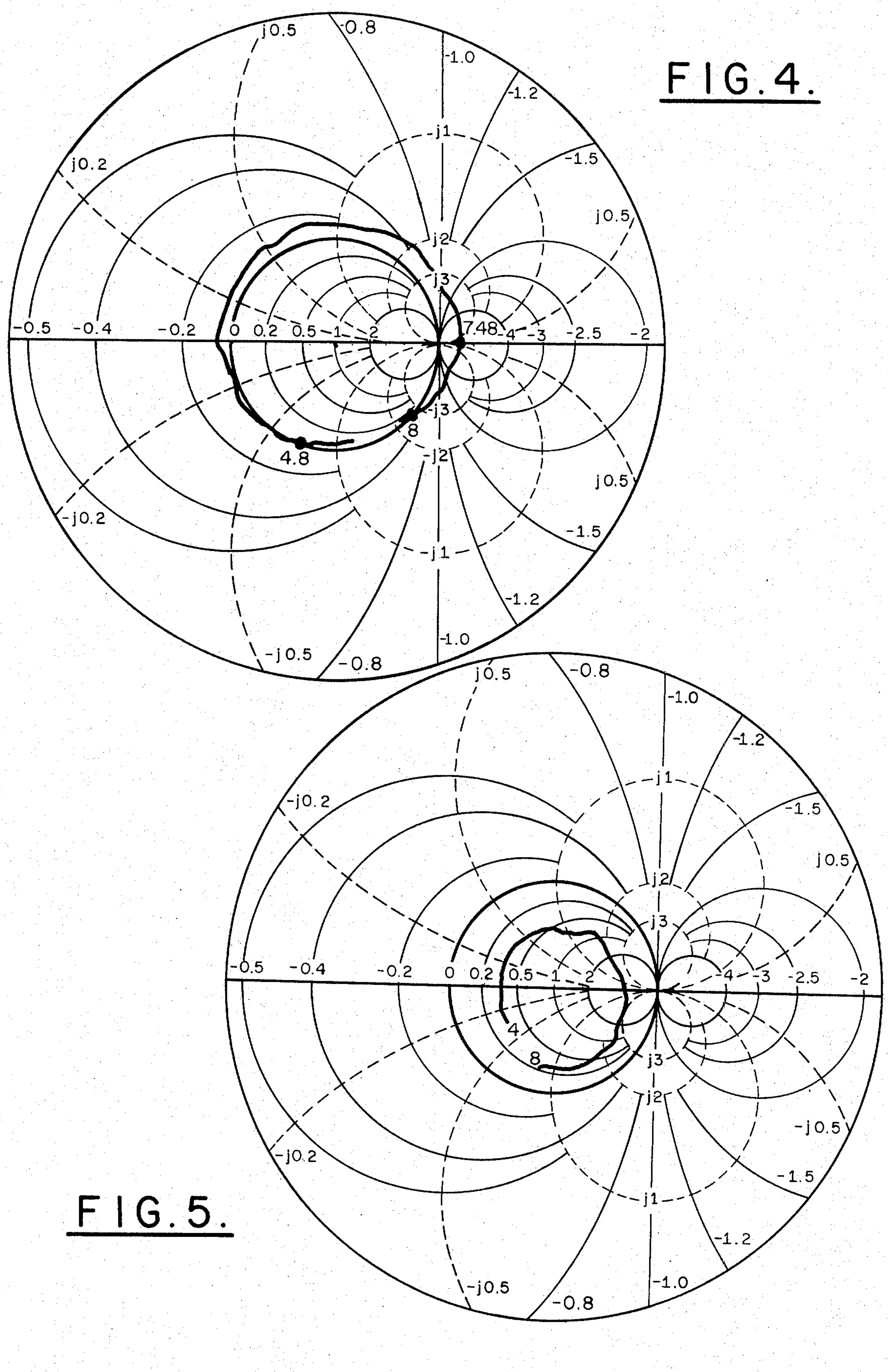
FIGS. 4, 5, 6, and 7 are graphs useful in explaining the operation of the apparatus of FIG. 1.

According to the present invention, the criteria a) and b) are achieved by selection of an appropriately packaged diode 6. Such may be accomplished by using a conventional network analyzer to select from commercially available diodes those which most clearly demonstrate the desired properties; i.e., that the diode package itself exhibits anti-resonance and at the same time small-signal negative resistance at the harmonic frequency $2f_F$. The type of diode package desired is found by use of a conventional network analyzer to have the characteristic illustrated in FIG. 4, which is the usual compressed Smith chart showing the small-signal impedance of a selected package diode and showing a suitable negative resistance at the second harmonic $2f_F$. This plot of small-signal impedance was made of a suitable packaged diode at a 25 milliamperes bias current. On the other hand, if the packaged diode does not exhibit a small-signal negative resistance at frequency $2f_F$, net gain and wide band amplification is not observed, as shown in FIG. 5.

Figure 10:
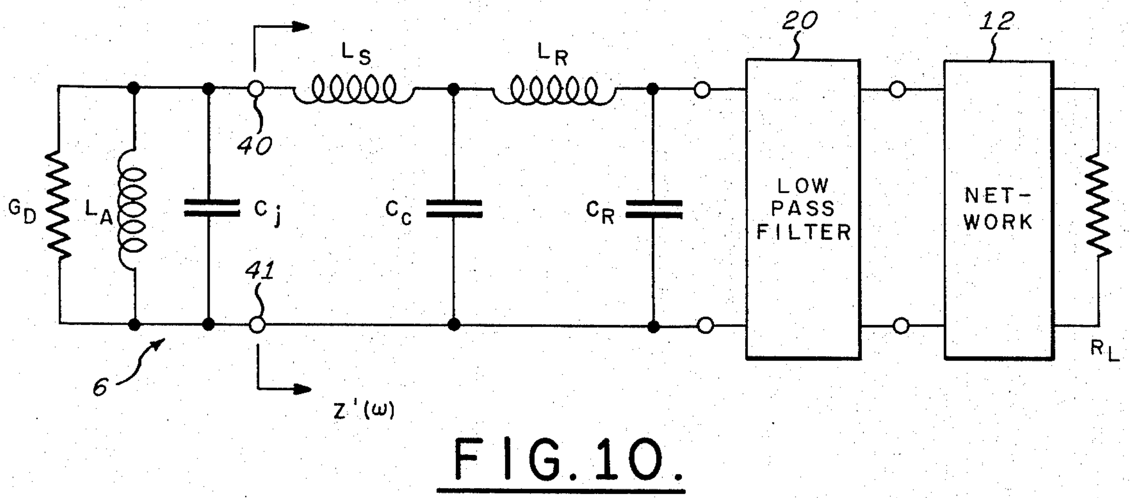
FIG. 10 is an equivalent circuit of the apparatus of FIG. 1.

Operation of the invention may be explained, according to one approach, by referring to FIG. 10, which shows the large-signal equivalent circuit of the amplifier of FIG. 1. Other approaches to the analysis may be alternatively used. In FIG. 10, the high efficiency diode package 6 may be represented by the parallel circuit to the left of the reference plane terminals 40, 41; it consists of the negative conductance $G_D$, the avalanching inductance $L_A$ representing the active parameter of the diode, and a capacitance $C_j$ representing the depletion layer capacitance of the diode. The inductance and capacitance to the immediate right of terminals 40, 41 represent parasitic parameters of the diode package. The value $L_S$ represents the diode package parasitic lead inductance and the capacitance $C_c$ represents the diode package parasitic capacitance. The inductance $L_R$ and the associated capacitance $C_R$ represent the discontinuity reactance introduced inherently into the model by the coaxial-to-radial transition at the juncture between diode package 6 and wall 8 (FIG. 1). The low pass filter 20 corresponds to filter 20 of FIG. 1, while network 12 is the impedance matching network 12 of FIG. 1. The value $R_L$ is the resistance of the load coupled to the output of the amplifier.

The small-signal terminal impedance of the packaged diode may be represented by:

$$Z_d(\omega) = R_d(\omega) + jX_d(\omega) \quad (1)$$

where $R_d(\omega)$ and $jX_d(107\ )$ are respectively the real and imaginary parts of the impedance of the packaged diode. The reactance $X_d(\omega)$ is given by:

$$X_d(\omega) = -K_o[(\omega_{S1}^2 - \omega^2)(\omega_{S2}^2 - \omega^2)/\omega(\omega_{p1}^2 - \omega^2)] \quad (2)$$

where:

$\omega_{S1}$ = the first series self-resonant frequency of the diode package, $\omega_{S2}$ = the second series self-resonant frequency of the diode package, $\omega_{p1}$ = the anti-resonance frequency of the diode package, and $K_o$ = a constant of proportionality.

Figure 6:
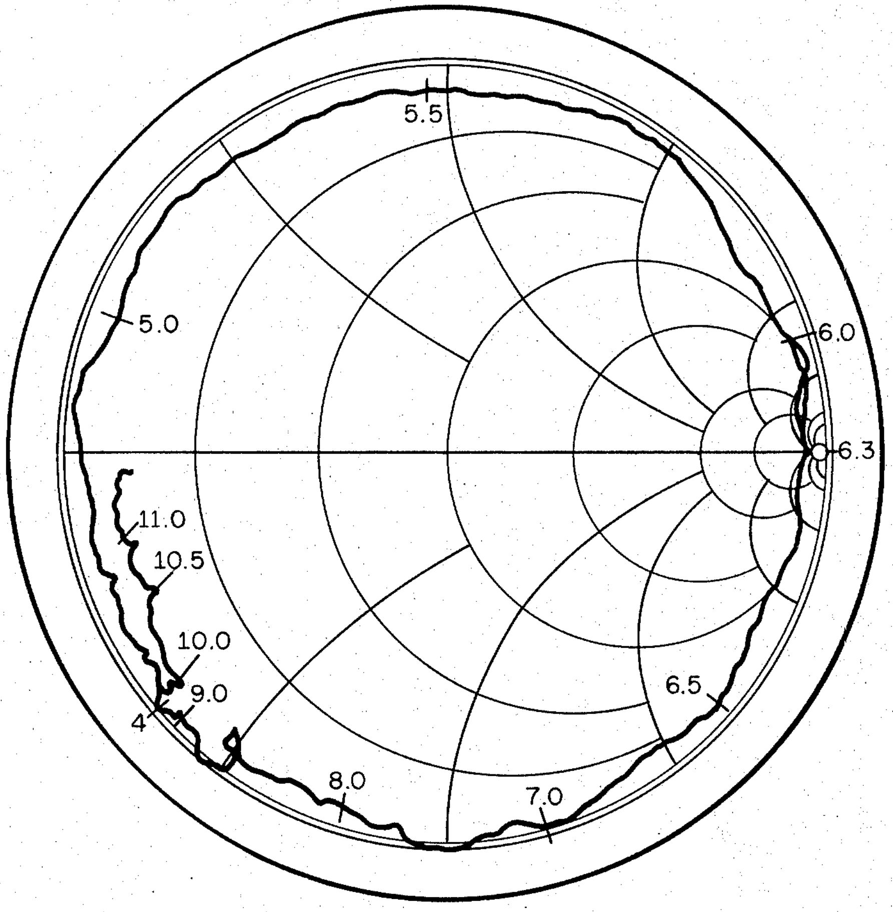
Figure 7:
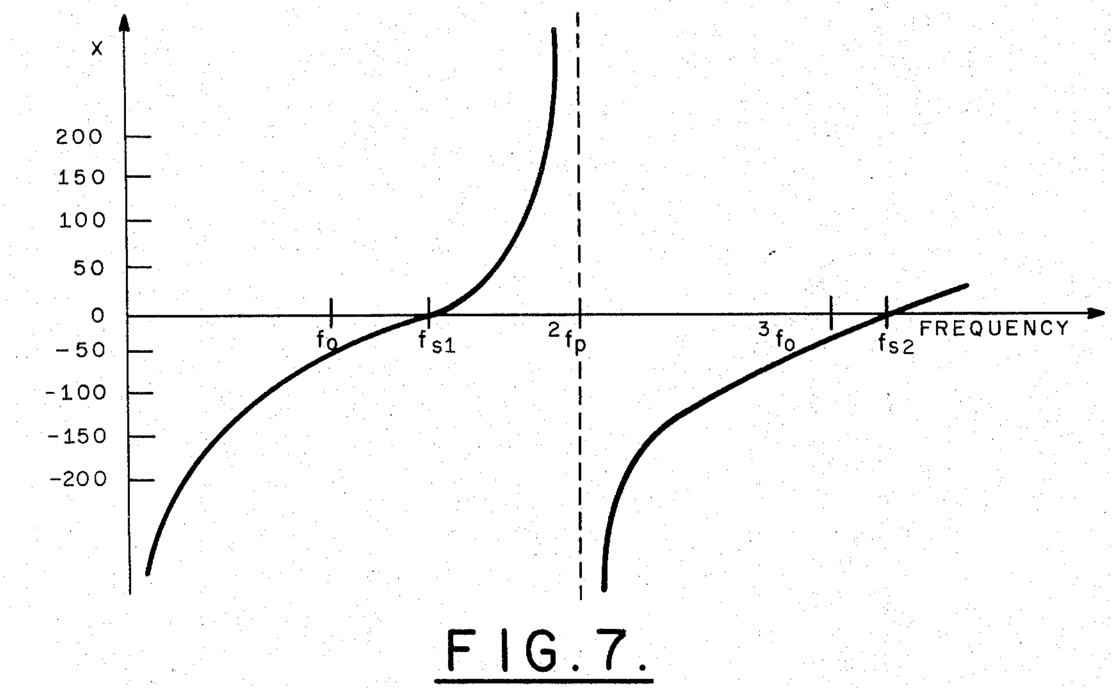

The values of $\omega_{S1}$, $\omega_{S2}$, $\omega_{p1}$, and $K_o$ are readily obtained from the terminal impedance of the diode package measured at voltage breakdown. A plot of that terminal impedance appears in FIG. 6; this is a reactance versus frequency plot of a suitable packaged amplifier diode illustrating second harmonic frequency ($2f_F$) anti-resonance.

Figure 8:
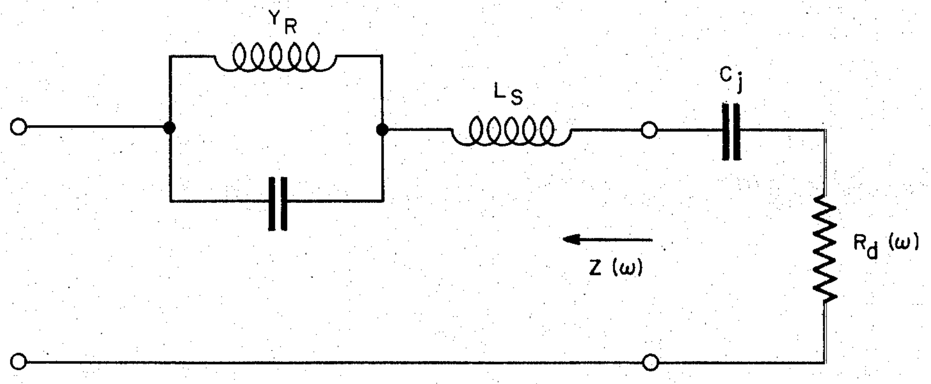
FIG. 8 is an equivalent circuit of the diode package of FIG. 1.

A circuit model for the small-signal impedance expressed by equation (2) is provided by FIG. 8. The parallel resonant circuit $Y_R$ represents the effect of the aforementioned coaxial-to-radial transition at the juncture between diode package 6 and wall 8 (FIG. 1). The inductance $L_S$ is defined as before as the parasitic lead inductance of the diode package internal bond lead, $C_j$ is the active junction capacitance, and $R_d(\omega)$ is again the active semiconductor negative resistance of the packaged diode at frequency $2f_F$. At the second harmonic $2f_F$, the series impedance of the parallel resonant circuit $Y_R$ approaches infinity. Therefore, the circuit impedance at $2f_F$ at the terminals of the packaged diode 6 is high and a small second harmonic current must lead to a large second harmonic voltage.

Thus, the small-signal negative resistance of the packaged diode 6 at the second harmonic frequency $2f_F$ serves significantly to enhance the growth of the second harmonic current flowing through the diode. The amplitude of the exciting second harmonic current need not be large, for it is the high impedance due to the anti-resonance characteristic that amplifies and produces the desired large second harmonic voltage. This large second harmonic voltage and the consequently increased electric field E across the packaged diode 6 helps to reduce the value of the input fundamental frequency signal amplitude necessary to excite the avalanche shock front wave within diode 6. Net gain is more quickly achieved for high efficiency mode operation of the diode by increasing $dE/dt$ across the diode.

Filter 20 is placed at diode 6 and is chosen so that:

a. the operating fundamental frequency $f_F$ of the amplifier falls in the pass band of filter 20, and
b. the stop band of filter 20 contains at least the second and third harmonics of frequency $f_F$.

The latter adjustment retains all harmonic energy in the region about diode package 6 and especially, when the input impedance of filter 20 at the third harmonic is that of a short circuit, permits efficient operation of diode 6 without the appearance of harmonic energy in the output of the amplifier. Thus, the band stop properties of filter 20 successfully confine all third harmonic current flow to the diode 6 itself.

Placing the wall 30 of filter 20 at the surface 5 of diode package 6 is beneficial, but some separation between wall 30 and surface 5 is tolerable. However, the separation may properly be chosen to be substantially less than $\lambda/2$ in all circumstances, since such a choice determines that the chance of time delayed triggering of diode package 6 is diminished as far as is possible. With finite values of the separation, time delayed triggering has an increased opportunity to destroy operation of the device as an amplifier, some diodes being more susceptible to this undesired event than others.

The quarter wave tuner 12 is used to resonate diode package 6 at the output frequency $f_F$. At $f_F$, diode package 6 behaves like an inductive reactance because of its avalanche multiplication properties. In one form, filter network 20 is a three section Tchebycheff low pass structure. At an operating frequency $f_F$, the filter network reactance resonates with the inductive reactance of diode package 6 due to the impact ionization processes. HOwever, at the third harmonic frequency, the network reactance is small, indicative of the series resonant characteristic of diode package 6 at the third harmonic. At the harmonic frequencies, the real part of the input impedance of the filter network is very low, so that little harmonic energy is dissipated. Thus, the reactance presented by the filter network to diode package 6 has a desirably small slope as a function of wave length at the second and third harmonic frequencies $f_H$.

Figure 9:
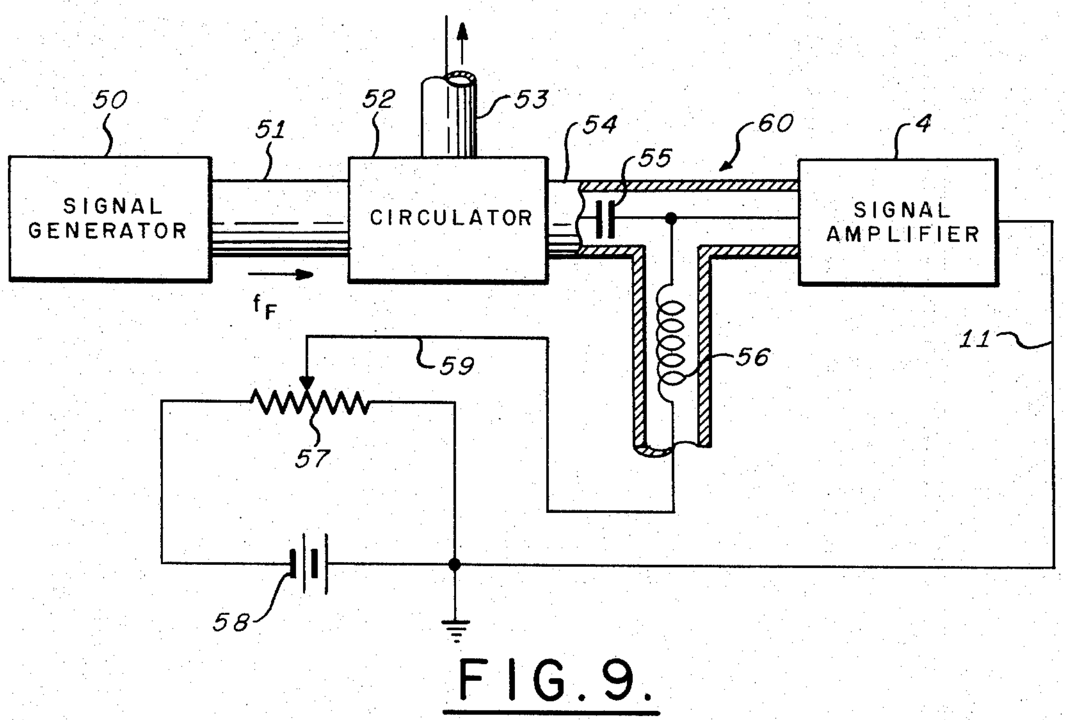
FIG. 9 is a block diagram showing how the invention is connected in use.

As noted above, the amplifier of FIG. 1 is operated by biasing diode package 6 into conduction and by applying a high frequency fundamental signal to the amplifier input by means of a signal circulator. When the amplitude of the input high frequency signal attains a sufficient value, an avalanche shock wave is excited in diode package 6, producing amplified output power. As seen in FIG. 9, one useful and conventional arrangement for supplying the needed bias current also represents one form of apparatus for making use of the invention. A signal generator 50 furnishes high frequency energy at frequency $f_F$ via transmission line 51 to a conventional triple port circulator 52 having an output port 53 and a port 54 for connection to the signal amplifier of FIG. 1. The output signal is derived from the signal amplifier and is also supplied through transmission line 54 to circulator 52, being extracted finally from output port 53. Transmission line 54 may simply comprise an extension of conductors 1 and 2 of FIG. 1. In line 54, the output and input signals pass through a conventional bias tee junction 60 flowing substantially undisturbed therethrough.

The role of bias tee junction 60 is to supply a circuit path for the application of the bias field across diode means 6. The bias field so imposed may be selected by adjustment of potentiometer tap 59 of potentiometer 57 across which voltage supply 58 is coupled. High frequency signals are not lost because of the presence of inductance 56 in the branch of tee 60. Bias current is prevented from flowing into generator 50 or within output port 53 because of the presence of the series capacitor 55.

While the invention has been described in its preferred embodiments, it is to be understood that the words which have been used are words of description rather than of limitation, and that changes within the purview of the appended claims may be made without departing from the true scope and spirit of the invention in its broader aspects.

I claim:

1. A high frequency signal amplifier comprising:
transmission line means having first and second high frequency conducting means,
conductive wall means for short circuiting said transmission line means for high frequency currents,
semiconductor diode package means including internal diode means, said semiconductor diode package means being characterized at the second harmonic of said high frequency signal by a series equivalent circuit representing said internal diode means parasitic lead inductance internal of said diode package at said second harmonic, the active junction capacitance of said internal diode means at said second harmonic, and the active semiconductor negative resistance of said internal diode means at said second harmonic, said semiconductor diode package means having a first conductive junction with said conductive wall means and a second conductive junction with said second high frequency conducting means, said first conductive junction with said conductive wall means forming a coaxial-to-radial line transition being characterized by an equivalent parallel resonant circuit whose series impedance is substantially infinity at said second harmonic of said high frequency signal, said semiconductor diode package means being antiresonant at said second harmonic, circuit means for applying a bias field across said semiconductor diode package means, distributed filter means cooperating with said first and second conducting means and providing an impedance step located at the plane of said second conductive junction for preventing time delayed triggered operation of said semiconductor diode package means, said distributed filter means comprising a geometrically symmetric filter having a low pass band and an upper stop band, said fundamental frequency falling in said low pass band and said harmonic frequency components in said upper stop band, and impedance matching means spaced from said filter means opposite said semiconductor diode package means and cooperating with said first and second conducting means.

2. Apparatus as described in claim 1 wherein:

said transmission line means comprises substantially coaxial inner and outer conductor means, and said distributed filter means is located on said inner conductor means and defines an impedance step located at said semiconductor diode package means.

3. Apparatus as described in claim 2 wherein said transmission line means, said conductive wall means, said semiconductor diode package means, said bias circuit means, said impedance matching means, and said distributed filter means are so arranged and constructed as to provide high frequency electric fields with strong fundamental and harmonic frequency components across said semiconductor means.

* * * * *